(12) United States Patent
Thoen

(10) Patent No.: US 10,492,002 B1
(45) Date of Patent: Nov. 26, 2019

(54) WIRELESS COMMUNICATION DEVICE

(71) Applicant: NXP B.V., Eindhoven (NL)

(72) Inventor: Steven Mark Thoen, Blanden (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/390,060

(22) Filed: Apr. 22, 2019

(51) Int. Cl.
*H04R 5/033* (2006.01)
*H04B 5/00* (2006.01)
*H04B 5/02* (2006.01)

(52) U.S. Cl.
CPC ........... *H04R 5/033* (2013.01); *H04B 5/0006* (2013.01); *H04B 5/0075* (2013.01); *H04B 5/02* (2013.01); *H04R 2420/07* (2013.01)

(58) Field of Classification Search
CPC .. H04R 5/033; H04R 2420/07; H04B 5/0006; H04B 5/0075; H04B 5/02
See application file for complete search history.

(56) References Cited

U.S. PATENT DOCUMENTS

| | | | |
|---|---|---|---|
| 2012/0014553 A1 | 1/2012 | Bonanno | |
| 2012/0283015 A1 | 11/2012 | Bonanno | |
| 2013/0316649 A1* | 11/2013 | Newham | H04W 88/04 455/41.2 |
| 2014/0031122 A1 | 1/2014 | Peng et al. | |
| 2017/0111834 A1* | 4/2017 | Belverato | H04B 5/0006 |

OTHER PUBLICATIONS

NXP; NxH3670 Bluetooth Low Energy Radio for Wireless Audio and Data Streaming; Fact Sheet; retrieved from the Internet https://www.nxp.com/docs/en/fact-sheet/NXH3670A4LFLT.pdf; 2 pages (Apr. 15, 2019).
Qualcomm; "aptX Low Latency"; retrieved from the Internet https://www.aptx.com/aptx-low-latency; 4 pages (Apr. 15, 2019).
Skyworks: Avnera; retrieved from the Internet www.avnera.com; 5 pages (Apr. 15, 2019).

* cited by examiner

*Primary Examiner* — Nguyen T Vo

(57) ABSTRACT

One example discloses a first wireless communication device, including: a first near-field transceiver and a first far-field transceiver; wherein the first wireless communication device is configured to communicate with a second wireless device having a second near-field transceiver and a second far-field transceiver; wherein the first near-field transceiver is configured to communicate with the second near-field transceiver; wherein the first far-field transceiver is configured to communicate with a third wireless device in a far-field frequency bandwidth; wherein the second far-field transceiver is configured to communicate with a fourth wireless device in the far-field frequency bandwidth; and wherein communications between the first wireless device and the third wireless device interfere beyond a threshold interference level with communications between the second wireless device and the fourth wireless device unless the first and second wireless devices are at least partially screened by a conductive host structure.

20 Claims, 3 Drawing Sheets

WIRELESS COMMUNICATION DEVICE

The present specification relates to systems, methods, apparatuses, devices, articles of manufacture and instructions for wireless device communication.

SUMMARY

According to an example embodiment, a set of wireless communication devices, comprising: a first wireless device having a first near-field transceiver and a first far-field transceiver; a second wireless device having a second near-field transceiver and a second far-field transceiver; wherein the first near-field transceiver is configured to communicate with the second near-field transceiver; wherein the first far-field transceiver is configured to communicate with a third wireless device in a far-field frequency bandwidth; wherein the second far-field transceiver is configured to communicate with a fourth wireless device in the far-field frequency bandwidth; and wherein communications between the first wireless device and the third wireless device interfere beyond a threshold interference level with communications between the second wireless device and the fourth wireless device unless the first and second wireless devices are at least partially screened by a conductive host structure.

In another example embodiment, the first and second wireless devices are wearable devices; the third wireless device is a high-latency device; and the fourth wireless device is a low-latency device.

In another example embodiment, the high-latency device is at least one of: a smartphone, a smartwatch, a medical device, a media player, or a data streaming device.

In another example embodiment, the high-latency device introduces a signal delay of 40 ms or greater.

In another example embodiment, the low-latency device is a gaming dongle.

In another example embodiment, the low-latency device is a real-time data device.

In another example embodiment, the low-latency device is a live-stream data device.

In another example embodiment, the low-latency device is a virtual-reality device.

In another example embodiment, the low-latency device is an enhanced-reality, or smart-glasses device.

In another example embodiment, the low-latency device introduces a signal delay of 20 ms or less.

In another example embodiment, the first far-field transceiver cannot simultaneously transmit and receive; and the second far-field transceiver can simultaneously transmit and receive.

In another example embodiment, the first far-field transceiver cannot simultaneously transmit and receive audio signals; and the second far-field transceiver can simultaneously transmit and receive audio signals.

In another example embodiment, the conductive host structure attenuates the far-field frequency bandwidth.

In another example embodiment, the conductive host structure is a user's head.

In another example embodiment, the first wireless device is located proximate to one of the user's ears; and the second wireless device is located proximate to another of the user's ears.

In another example embodiment, the near-field transceivers communicate using at least one of: an NFMI protocol, an NFEI protocol, or an NFEMI protocol.

In another example embodiment, the near-field transceivers communicate using a non-propagating quasi-static magnetic near-field signal; or a non-propagating quasi-static electric near-field signal coupled to the conductive host structure.

In another example embodiment, the first wireless device forwards a first media signal from the third wireless device to the second wireless device; and the second wireless device forwards a second media signal from the fourth wireless device to the first wireless device.

In another example embodiment, the first media signal is a right stereo audio signal;

and the second media signal is a left stereo audio signal.

According to an example embodiment, a first wireless communication device, comprising: a first near-field transceiver and a first far-field transceiver; wherein the first wireless communication device is configured to communicate with a second wireless device having a second near-field transceiver and a second far-field transceiver; wherein the first near-field transceiver is configured to communicate with the second near-field transceiver; wherein the first far-field transceiver is configured to communicate with a third wireless device in a far-field frequency bandwidth; wherein the second far-field transceiver is configured to communicate with a fourth wireless device in the far-field frequency bandwidth; and wherein communications between the first wireless device and the third wireless device interfere beyond a threshold interference level with communications between the second wireless device and the fourth wireless device unless the first and second wireless devices are at least partially screened by a conductive host structure.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
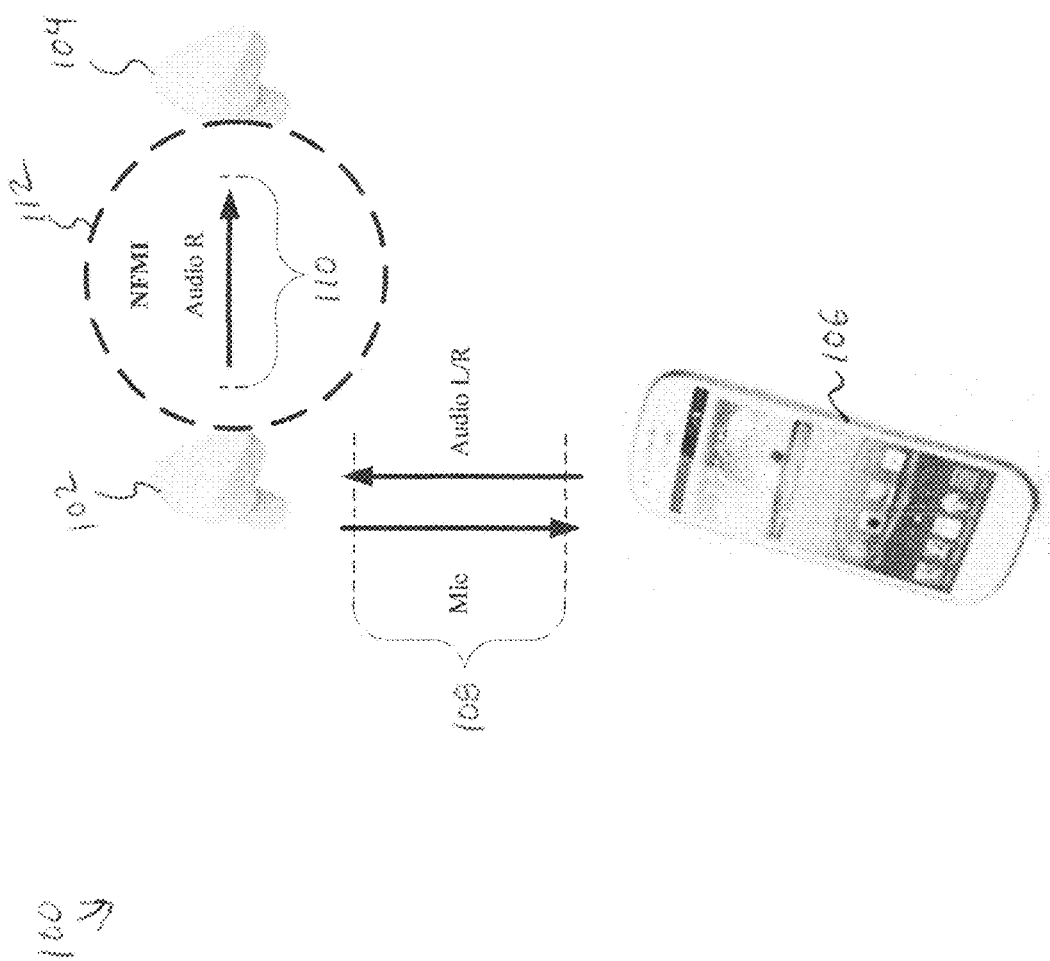
FIG. 1 pictorially depicts a first example set of wireless devices for wireless communication between wireless devices used for media playback and phone communication.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Wireless devices, such as wireless earbuds (also known as Hearables), in various examples include embedded voice, sound and sensor capabilities. Such wireless devices can be designed to support playback of stereo sound from an external device such as a cellphone, making phone calls, responding to voice commands, detecting sound events, and so on.

While the examples discussed below tend to focus on example embodiments which transmit and receive audio data, the teachings herein also apply to media data, video data, sensor data, medical data, battery status, device settings and other data.

FIG. 1 pictorially depicts a first example 100 set of wireless devices for wireless communication between wireless devices used for media playback and phone communication. Shown in the first example 100 is a first wireless device 102 (e.g. left earbud), a second wireless device 104 (e.g. right earbud), a third wireless device 106 (e.g. smartphone), a far-field wireless link 108 (e.g. audio left/right and microphone (mic) signals), a near-field wireless link 110 (e.g. right only audio signal), and a conductive host structure 112.

In this first example 100 single-sided NFMI set of wireless devices, the first wireless device 102 (a.k.a. the master earbud) includes a data connection (i.e. the far-field wireless link 108) either through: a cloud network, a smartphone, or another device. The first wireless device 102 effects audio playback and communication using one or more input transducers (e.g. local microphones) and one or more output transducers (e.g. speakers).

In this first example 100, data (e.g. left/right audio and microphone signals) is streamed to the wireless devices 102, 104 (e.g. earbuds) over the far-field wireless link 108, perhaps using an A2DP profile. The data includes a complete (e.g. L and R stereo audio) signal which is sent to just one of the wireless devices 102 (i.e. the L earbud).

The far-field wireless link 108 uses far-field energy to communicate with a smartphone or other devices, such as tablet, computers, etc., using far-field (e.g. RF) communication protocols including: Bluetooth Classic (BTC), Bluetooth Low Energy (BLE), WiFi, 5G, and any other RF protocol.

In this example, the near-field wireless link 110 forwards a relevant portion of the audio signal (e.g. just the R audio track) to the other wireless device 104 (e.g. R earbud). If a user is wearing the earbuds 102, 104, then the near-field signal travels through and/or around the conductive host structure 112 (e.g. a human body, a user's head, etc.) thereby creating a full stereo audio experience at the earbuds 102, 104.

Various example near-field communication protocols include: Near-Field Magnetic Induction (NFMI), Near-Field Electric Induction (NFEI), or Near-Field Electro-Magnetic Induction (NFEMI). These near-field signals that propagate using various conductive or non-conductive host structures (i.e. the conductive host structure 112). Such near-field transceivers communicate using non-propagating quasi-static magnetic near-field signals and/or non-propagating quasi-static electric near-field signal coupled to such host structures.

In various example embodiments, the first wireless device 102 (e.g. left earbud) and the second wireless device 104 (e.g. right earbud) are asymmetric. Asymmetric is herein defined that one device 102 is dedicated to both near-field and far-field signal communications and thus has greater electrical circuit and energy (e.g. media playback, cell phone, and battery amperage) requirements than the other device 104 that only needs to receive near-field signals (e.g. right audio).

These wireless devices (e.g. smartphones, hearable earbuds, etc.) using the Bluetooth classic for the far-field wireless link 108 can only communicate with one other wireless device at a time. Bluetooth Classic however is not a good fit for wireless gaming headset applications due to it's high-latency and lack of simultaneous forward/backward communications.

For example a typical BT Classic latency for audio playback is >100 ms with some optimized implementations reaching 40 ms latency. Latency is however key in gaming applications in order to not lose a gaming user's competitive edge when picking up audio cues (e.g. in a first-person shooter game). A latency of <20 ms is often preferred for wireless gaming headsets.

Gaming headsets also preferably include simultaneous forward/backward communications (e.g. stereo audio in the forward direction and mono microphone signal in the backward direction). This combined use case of audio flowing in both directions is not supported by BT Classic.

For at least these reasons, wireless gaming headsets typically prefer proprietary (e.g. closed ecosystem, non-standardized) wireless audio solutions.

Figure 2:
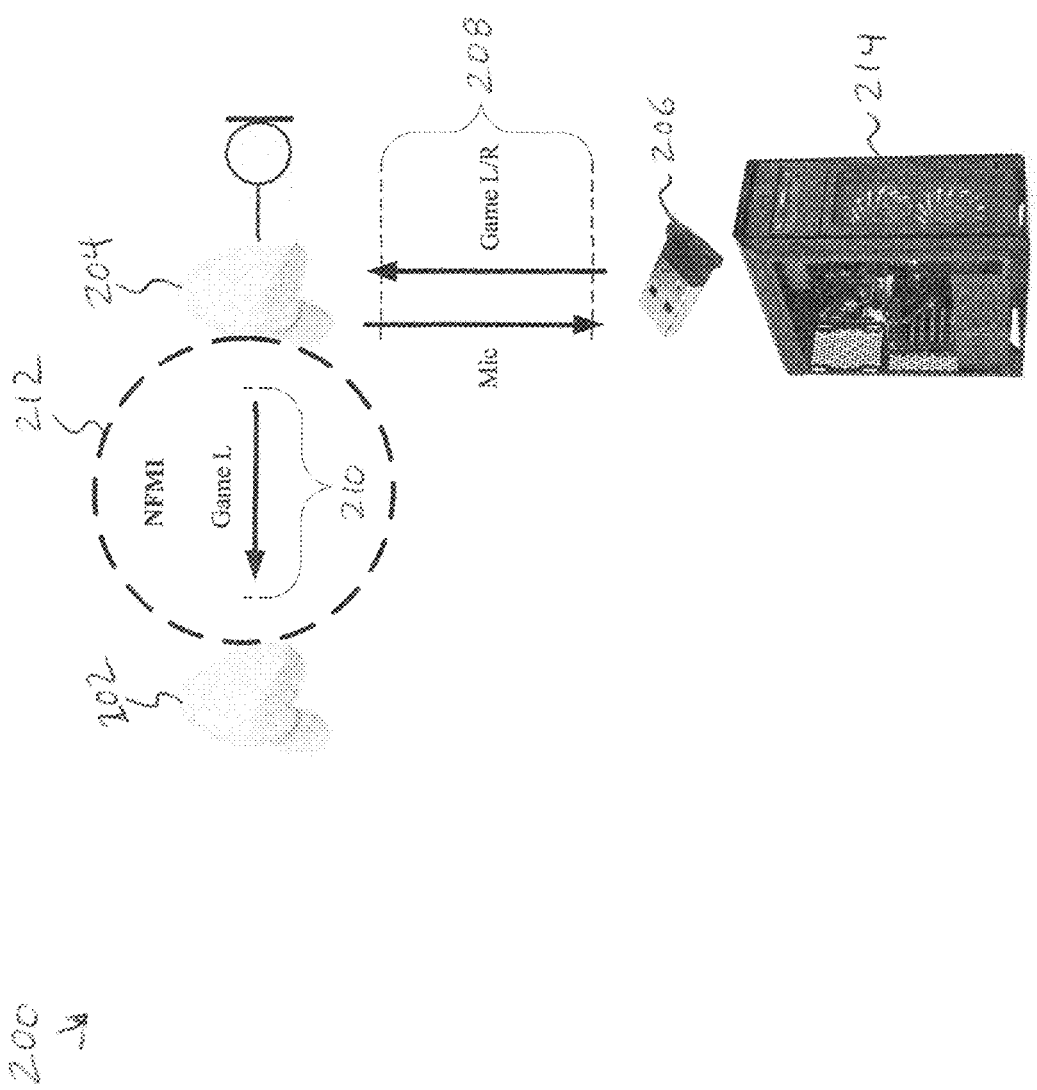
FIG. 2 pictorially depicts a second example set of wireless devices for wireless communication between wireless devices used for gaming communication.

FIG. 2 pictorially depicts a second example 200 set of wireless devices for wireless communication between wireless devices used for gaming communication. Shown in the second example 200 is a first wireless device 202 (e.g. left earbud), a second wireless device 204 (e.g. right earbud), a third wireless device 206 (e.g. smartphone), a far-field wireless link 208 (e.g. low-latency gaming audio left/right and microphone signals), a near-field wireless link 210 (e.g. left only audio signal), a conductive host structure 212, and a gaming computer 214.

The far-field wireless link 208 shows example game audio left/right and microphone channels for supporting low-latency gaming data streams. In this second example 200, data (e.g. audio and microphone signals) is streamed between the wireless devices 202, 204 (e.g. earbuds) over the far-field wireless link 208, in some example embodiments using a BTC profile.

In various example embodiments, the first wireless device 202 (e.g. left earbud) and the second wireless device 204 (e.g. right earbud) are also asymmetric. Asymmetric is herein defined that one device 204 is dedicated to both near-field and far-field signal communications and thus has greater electrical circuit and energy (e.g. gaming and battery amperage) requirements than the other device 202 that only needs to receive near-field signals (e.g. left audio).

In some example embodiments, the second example 200 set of wireless devices are gaming hearables and the second wireless device 204 (e.g. right earbud) includes an NXP Semiconductor's NxH3670 chip. During gaming mode in NxH3670-based hearables, stereo gaming audio is sent using the far-field wireless link 208 from the third wireless device 206 (e.g. dongle) to the second wireless device 204 (e.g. right earbud), which in turn uses the near-field wireless link 210 (e.g. NFEMI) to forward the left audio gaming stream to the first wireless device 202 (e.g. left earbud).

The proprietary (e.g. closed ecosystem) nature of this far-field wireless link 208 lacks direct compatibility with other consumer devices such as the third wireless device 106 (e.g. smartphone) use of the far-field wireless link 108 (e.g. BTC, BLE, WiFi) in FIG. 1. Such other devices would also require a dongle.

Now discussed are a set of cross-over/combination wireless devices (e.g. hearables, earbuds, headphones, body worn devices, etc.) that can be used for both low-latency (e.g. wireless gaming) as well as high-latency (e.g. consumer audio, phone calls, media playback, etc.) applications.

Figure 3:
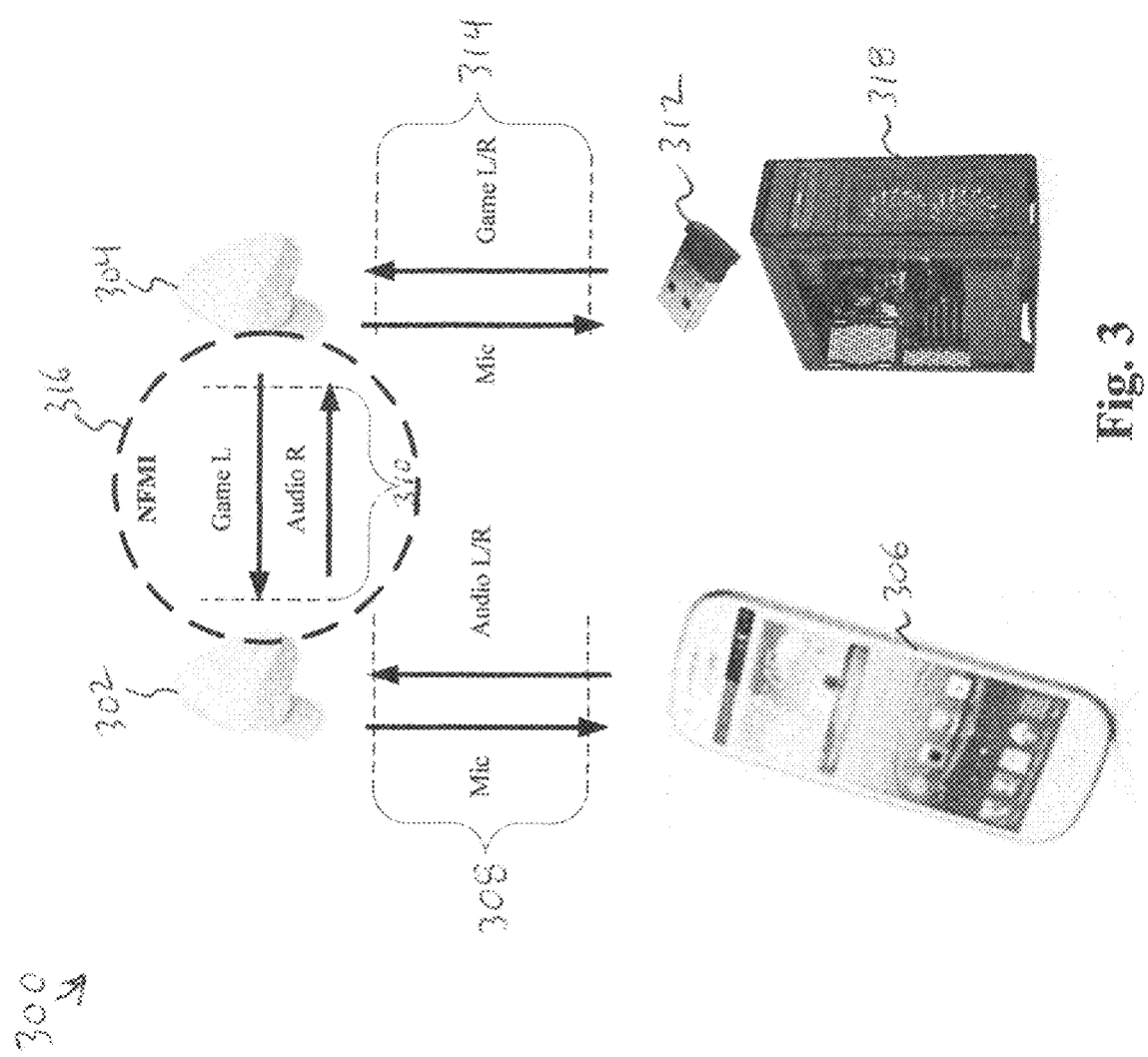
FIG. 3 pictorially depicts a third example set of wireless devices for wireless communication between wireless devices used for combined media playback, phone communication, and gaming communication.

FIG. 3 pictorially depicts a third example 300 set of wireless devices for wireless communication between wireless devices used for combined media playback, phone communication, and gaming communication. The third example 300 set of wireless devices includes a first wireless device 302 (e.g. left earbud), a second wireless device 304 (e.g. right earbud), a third wireless device 306 (e.g. smartphone), a first far-field wireless link 308, a near-field wireless link 310, a fourth wireless device 312 (e.g. dongle), a second far-field wireless link 314, a conductive host structure 316, and a gaming computer 318.

The first wireless device 302 (e.g. first earbud) includes a first near-field transceiver circuit (not shown) and a first far-field transceiver circuit (not shown). The second wireless device 304 (e.g. second earbud) includes a second near-field transceiver circuit (not shown) and a second far-field transceiver circuit (not shown).

The first near-field transceiver is configured to communicate with the second near-field transceiver.

The first far-field transceiver is configured to communicate with the third wireless device 306 (e.g. smartphone) in a far-field frequency bandwidth over the first far-field wireless link 308.

The second far-field transceiver is configured to communicate with the fourth wireless device 312 (e.g. gaming dongle) in the same far-field frequency bandwidth over the second far-field wireless link 314. As a result, communications between the first wireless device 302 and the third wireless device 306 can interfere beyond a threshold interference level with communications between the second wireless device 304 and the fourth wireless device 312 unless the first and second wireless devices 302, 304 are coupled to the conductive host structure 316 or are at least partially screened, separated, and/or blocked by the conductive host structure 316.

A greater degree to which the conductive host structure 316 electrically screens, separates, and/or blocks the first and second wireless devices 302, 304 then a corresponding greater degree that any far-field signal-interference between the first wireless device 302 and the third wireless device 306 and the second wireless device 304 and the fourth wireless device 312 is also reduced. In some example embodiments as long as the far-field interference is less than or equal to a threshold level, then one or more of the far-field wireless devices may be able to correct for any analog and/or digital signal errors.

In various example embodiments, since each of the first and second wireless devices 302, 304 include one near-field transceiver and one far-field transceiver, form factors and battery usage for the first and second devices 302, 304 is substantially balanced for a better user experience.

To reduce such interference in some example embodiments, the third wireless device 306 (e.g. smartphone) is separated by a distance from the fourth wireless device 312 (e.g. dongle) in the gaming computer 318 to further minimize in-band interference. However, when the first and second wireless devices 302, 304 (e.g. earbuds) are worn by a user, they are separated by the user's body (e.g. user's head) and thus the user's body attenuates (e.g. creates a block to) RF (i.e. GHz) interference between the third wireless device 306 and the fourth wireless device 312 as received by either the first or second wireless devices 302, 304 (e.g. earbuds).

The third example 300 set of wireless devices thus combine standardized high-latency communication protocols (e.g. BTC, BLE, WiFi, etc.) on the first far-field wireless link 308 with proprietary low-latency communication protocols (e.g. NXP Semiconductor's NxH3670 protocol) on the second far-field wireless link 314.

The set of wireless devices 300 are configured to enable both synchronous and asynchronous communication with other wireless devices (e.g. 302, 304, 306, 312) even when the far-field signals are operating is the same far-field frequency bandwidth.

In some example embodiments, since the third wireless device 306 (e.g. smartphone) and the fourth wireless device 312 (e.g. dongle) communicate asynchronously in the same far-field bandwidth (e.g. GHz range), potential mutual interference at either the first wireless device 302 (e.g. left earbud) or the second wireless device 304 (e.g. right earbud) is reduced since the first wireless device 302 (e.g. left earbud) and the second wireless device 304 (e.g. right earbud) are on substantially opposite sides of the conductive host structure 316 thereby improving both communication link's robustness.

The high-latency devices communicating on the first far-field wireless link 308 can include a smartphone, a smartwatch, a medical device, a media player, or a data streaming device.

The low-latency devices communicating on the second far-field wireless link 314 can include a gaming dongle, a real-time data device, a live-stream data device, a virtual-reality experience, an enhanced-reality experience, or smart-glasses devices.

In some example embodiments, the high-latency device introduces a signal delay of 40 ms or greater, and the low-latency device introduces a signal delay of 20 ms or less.

The near-field transceivers communicate using at least one of: an NFMI protocol, an NFEI protocol, or an NFEMI protocol. Such protocols tend to be very low latency, low power, and are stable, thereby preserving the gaming experience. Such protocols also provide sufficient bandwidth to support at least simultaneous earbud-to-earbud audio exchange connections.

To summarize some example embodiments of the third example 300 set of wireless devices, since the Bluetooth Classic (BTC) (i.e. for higher latency stereo audio) and the NxH3670 (i.e. for low latency gaming audio and microphone) solution are in separate earbuds with the human head acting as a shield for the 2.4 GHz RF, transmission signal, the mutually induced interference is quite low. This significantly increases the robustness of both links. These example embodiments allow both BTC and NXH3670 to be active at the same time. This enables new use cases where a user listens to his favorite Spotify tracks from his cellphone while at the same time enjoying the gaming audio at low latency. These example embodiments also split power consumption between both Hearables 302, 304, ensuring balanced battery lifetime of both devices.

Advantages of the third example 300 set of wireless devices include: doubling link data-rate, simultaneously listening to music while gaming, and splitting power consumption between both the first and second wireless devices 302, 304 (e.g. earbuds) thereby ensuring a balanced battery lifetime of both devices.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and, are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A set of wireless communication devices, comprising:
a first wireless device having a first near-field transceiver and a first far-field transceiver;
a second wireless device having a second near-field transceiver and a second far-field transceiver;
wherein the first near-field transceiver is configured to communicate with the second near-field transceiver;
wherein the first far-field transceiver is configured to communicate with a third wireless device in a far-field frequency bandwidth;
wherein the second far-field transceiver is configured to communicate with a fourth wireless device in the far-field frequency bandwidth; and
wherein communications between the first wireless device and the third wireless device interfere beyond a threshold interference level with communications between the second wireless device and the fourth wireless device unless the first and second wireless devices are at least partially screened by a conductive host structure.

2. The devices of claim 1:
wherein the first and second wireless devices are wearable devices;
wherein the third wireless device is a high-latency device; and
wherein the fourth wireless device is a low-latency device.

3. The devices of claim 2:
wherein the high-latency device is at least one of: a smartphone, a smartwatch, a medical device, a media player, or a data streaming device.

4. The devices of claim 2:
wherein the high-latency device introduces a signal delay of 40 ms or greater.

5. The devices of claim 2:
wherein the low-latency device is a gaming dongle.

6. The devices of claim 2:
wherein the low-latency device is a real-time data device.

7. The devices of claim 2:
wherein the low-latency device is a live-stream data device.

8. The devices of claim 2:
wherein the low-latency device is a virtual-reality device.

9. The devices of claim 2:
wherein the low-latency device is an enhanced-reality, or smart-glasses device.

10. The devices of claim 2:
wherein the low-latency device introduces a signal delay of 20 ms or less.

11. The devices of claim 1:
wherein the first far-field transceiver cannot simultaneously transmit and receive; and
wherein the second far-field transceiver can simultaneously transmit and receive.

12. The devices of claim 1:
wherein the first far-field transceiver cannot simultaneously transmit and receive audio signals; and
wherein the second far-field transceiver can simultaneously transmit and receive audio signals.

13. The devices of claim 1:
wherein the conductive host structure attenuates the far-field frequency bandwidth.

14. The devices of claim 1:
wherein the host structure is a user's head.

15. The devices of claim 14:
wherein the first wireless device is located proximate to one of the user's ears; and
wherein the second wireless device is located proximate to another of the user's ears.

16. The devices of claim 1:
wherein the near-field transceivers communicate using at least one of: an NFMI protocol, an NFEI protocol, or an NFEMI protocol.

17. The devices of claim 16:
wherein the near-field transceivers communicate using a non-propagating quasi-static magnetic near-field signal; or
wherein the host structure is a conductive host structure and the near-field transceivers communicate using a non-propagating quasi-static electric near-field signal coupled to the conductive host structure.

18. The devices of claim 1:
wherein the first wireless device forwards a first media signal from the third wireless device to the second wireless device; and
wherein the second wireless device forwards a second media signal from the fourth wireless device to the first wireless device.

19. The devices of claim 18:
wherein the first media signal is a right stereo audio signal; and
wherein the second media signal is a left stereo audio signal.

20. A first wireless communication device, comprising:
a first near-field transceiver and a first far-field transceiver;
wherein the first wireless communication device is configured to communicate with a second wireless device having a second near-field transceiver and a second far-field transceiver;
wherein the first near-field transceiver is configured to communicate with the second near-field transceiver;
wherein the first far-field transceiver is configured to communicate with a third wireless device in a far-field frequency bandwidth;
wherein the second far-field transceiver is configured to communicate with a fourth wireless device in the far-field frequency bandwidth; and
wherein communications between the first wireless device and the third wireless device interfere beyond a threshold interference level with communications between the second wireless device and the fourth wireless device unless the first and second wireless devices are at least partially screened by a conductive host structure.

* * * * *